INVENTOR.
FRANCIS H. SHEPARD Jr.
BY
Curtis, Morris & Safford
ATTORNEYS

June 25, 1968 F. H. SHEPARD, JR 3,390,381

CAPACITOR SAMPLE AND HOLD CIRCUIT EMPLOYING SIGNAL COMPARISON AND REGENERATION

Original Filed May 19, 1960 3 Sheets-Sheet 2

INVENTOR.
FRANCIS H. SHEPARD Jr.

BY

Curtis, Morris & Safford

ATTORNEYS

INVENTOR.
FRANCIS H. SHEPARD Jr.
BY
Curtis, Morris & Safford
ATTORNEYS

United States Patent Office 3,390,381
Patented June 25, 1968

3,390,381

CAPACITOR SAMPLE AND HOLD CIRCUIT EMPLOYING SIGNAL COMPARISON AND REGENERATION

Francis H. Shepard, Jr., Berkeley Heights, N.J., assignor to Vogue Instrument Corp., Plainview, N.Y., a corporation of New York Application May 19, 1960, Ser. No. 30,216, now Patent No. 3,273,013, dated Sept. 13, 1966, which is a continuation-in-part of application Ser. No. 641,653, Feb. 21, 1957. Divided and this application May 12, 1966, Ser. No. 566,453
7 Claims. (Cl. 340—173)

ABSTRACT OF THE DISCLOSURE

Electronic memory system in which a digit (e.g. any decimal digit) is represented by a corresponding voltage level on a capacitor, the voltage being periodically regenerated to provide for long-term accuracy. Regeneration is accomplished at a rate fast enough to prevent any effective change of the voltage stored on the capacitor, and accuracy is obtained by resetting the capacitor voltage to an exact level corresponding to whatever level should then be stored on the capacitor. Change from one digit to any other within the range of the system is electronically controlled in accordance with an input signal.

Figure 1:
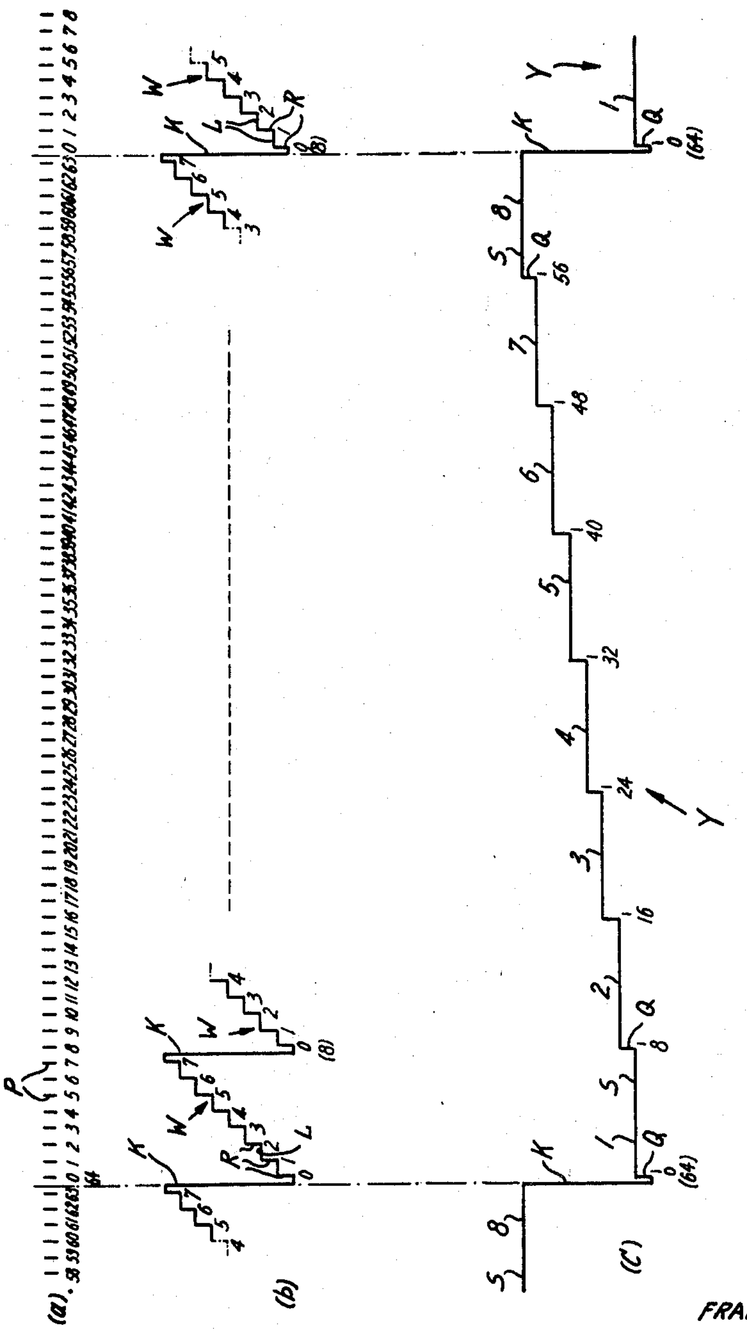

This application is a continuation-in-part of copending application Ser. No. 641,653 filed Feb. 21, 1957, now United States Patent 2,947,910, and a division of copending application Ser. No. 30,216 filed May 19, 1960, now United States Patent 3,273,013.

This invention relates to an improved technique and apparatus for identifying and remembering a number, more particularly it relates to an electronic memory and system for representing a long series of numbers of characters in electrical form and for remembering and easily identifying any chosen number of the series.

An object of this invention is to provide a high speed memory which has the relative simplicity and tremendous range of an electric voltage capacitor memory, but with effectively the permanence or information retaining ability of a magnetic core memory.

Another object is to provide a system of counting which is compatible with practical electrical circuits.

Still another object is to provide a numbering and memory system which can be built inexpensively and compactly and which will operate with an extremely high degree of reliability.

These and other objects will in part be pointed out in and in part understood from the description of the invention given hereinafter.

There are many applications where to obtain high speed operation it is necessary to represent a series of numbers in terms of electrical impulses. Thus, in a high speed printer, such as shown in the inventor's U.S. Patent No. 2,787,210, information, for example in the form of binary digits, is read off of a magnetic tape and typed out on paper at the rate of about 40,000 words per minute. This compares with a typing speed of about 70 words per minute for a good secretary. In this printer, 64 alphanumeric characters, corresponding to the keyboard characters of an ordinary office typewriter, are arranged around each of 190 closely-spaced circular type-wheels. These are rotated in unison at high speed and paper to be printed on is moved stepwise tangentially beneath them. During each step-by-step pause of the paper, a row of 190 hammers beneath the paper and wheels are selectively fired upward and drive the paper against an inked ribbon and any chosen print character on each wheel to print an entire line of words across the paper. Now, it takes at least one revolution of the print wheels for every one of the 64 characters on each wheel to rotate opposite the type hammers. Moreover, each hammer must be actuated at the precise instant (within a few microseconds) that the desired character moves opposite it. This then requires a highly accurate way of counting the characters to identify them as they rotate past the hammers. Furthermore, because it takes a finite time, i.e. one revolution of the type wheel, for all 64 characters to pass a hammer, it is necessary to remember, at least for this long, what character is to be printed until this particular character is in printing position. Thus, for each of the 190 hammers and type wheels it is necessary to provide a high speed way of counting or numbering the positions of the type characters, and of remembering the characters to be printed after they have been read from the tape and until they have actually been printed. The present invention provides a highly successful and advantageous system for doing this.

One previously known type of memory uses an array of small saturable magnetic cores or toroids in which information in the form of binary numbers is stored according to whether each core is magnetized in one direction or the other. Because the information is stored as a relatively permanent magnetic flux, a memory device of this kind is effectively perfect in its ability to remember any given number indefinitely and until told to remember a different one. Unfortunately, because a magnetic core normally has only one of two states, that is, magnetized in one direction or the other, to be able to remember a large number, e.g. a number as large as 64, a great number of individual cores must be used in a rather intricate array. This is a serious drawback from the standpoint of cost where a multitude of large number series must be remembered.

A second kind of memory generally known before uses simply a capacitor in which an electrical charge corresponding to a number can be stored. Here, the number which can be remembered can be any one of a large plurality of them depending upon the sensitivity and resolving ability of associated equipment used to read the memory. Thus, for example, it is an easy matter with inexpensive, existing equipment to charge a capacitor with a voltage corresponding to any digit from 0 to 10 and thereafter accurately read the voltage to determine the number. Unfortunately, this kind of memory tends to "forget" the information stored in it since the electrical charge on a capacitor leaks off in time. This has been so serious a defect that until now capacitor memories have had only very limited practical use. The present invention eliminates this difficulty and makes possible a capacitor memory having wide range, extreme reliability and remembering ability, and low cost.

In accordance with one aspect of the present invention, a series of numbers is represented as a voltage which increases step-by-step like a staircase, each step representing a separate and distinct number. Now, for practical considerations such as the ability of associated equipment to distinguish between voltage levels, and for high reliability it is desirable to provide a rise of several volts or so for each level of the staircase. Thus, in a memory system for use with the above described high speed printer having 64 characters around the type wheels, two voltage staircases are used. Each staircase has eight levels, the first or fine staircase having a rise or step corresponding to each character, the other or coarse staircase having a respective step corresponding to each successive group of eight characters. By determining first the particular level or step of the coarse staircase, and then the level of the fine, any one of the 64 characters to be printed can be chosen. If there were 100 characters, then a coarse and a fine staircase of 10 steps each could be used and counting would be analogous to conventional decimal arithmetic.

In accordance with a principal aspect of the invention, a number is remembered by charging a capacitor to a corresponding voltage level. Then, by comparing this remembered voltage to a voltage staircase representing a series of numbers, for example one to eight, a coincidence pulse marking the instant the staircase voltage equals the remembered voltage is obtained. This pulse, which identifies the number being remembered, in turn is used to actuate momentarily a unique electronic switch provided as part of the system to apply to the memory capacitor a voltage derived from the staircase voltage and equal to the voltage which should be remembered. In this way the remembered voltage on the capacitor is continuously regenerated. Thus the difficulty with previous capacitor memories of gradually losing the information stored is eliminated. This new memory can retain the information read into it indefinitely, but, as will be explained in detail later on, can be reset to remember a new number almost instantaneously. Readout of information is easily accomplished without losing the information stored. A single capacitor memory can easily remember any of 10 different numbers and this is of far reaching importance in the field of electronic computing.

A better understanding of the invention together with a fuller appreciation of its many advantages will best be gained from the following description given in connection with the accompanying drawings wherein:

FIGURE 1 illustrates a method of counting according to the invention; line *a* representing a repetitive sequence of 64 pulses evenly spaced in time; each corresponding to a number from 1 to 64 as indicated, line *b* showing a series of fine staircase waveforms having vertical steps or risers on the occurrence of each pulse in line *a* up to eight, then repeating for the next eight and so on; and line *c* showing a coarse staircase having a step for each group of eight pulses, and so on.

Figure 2:
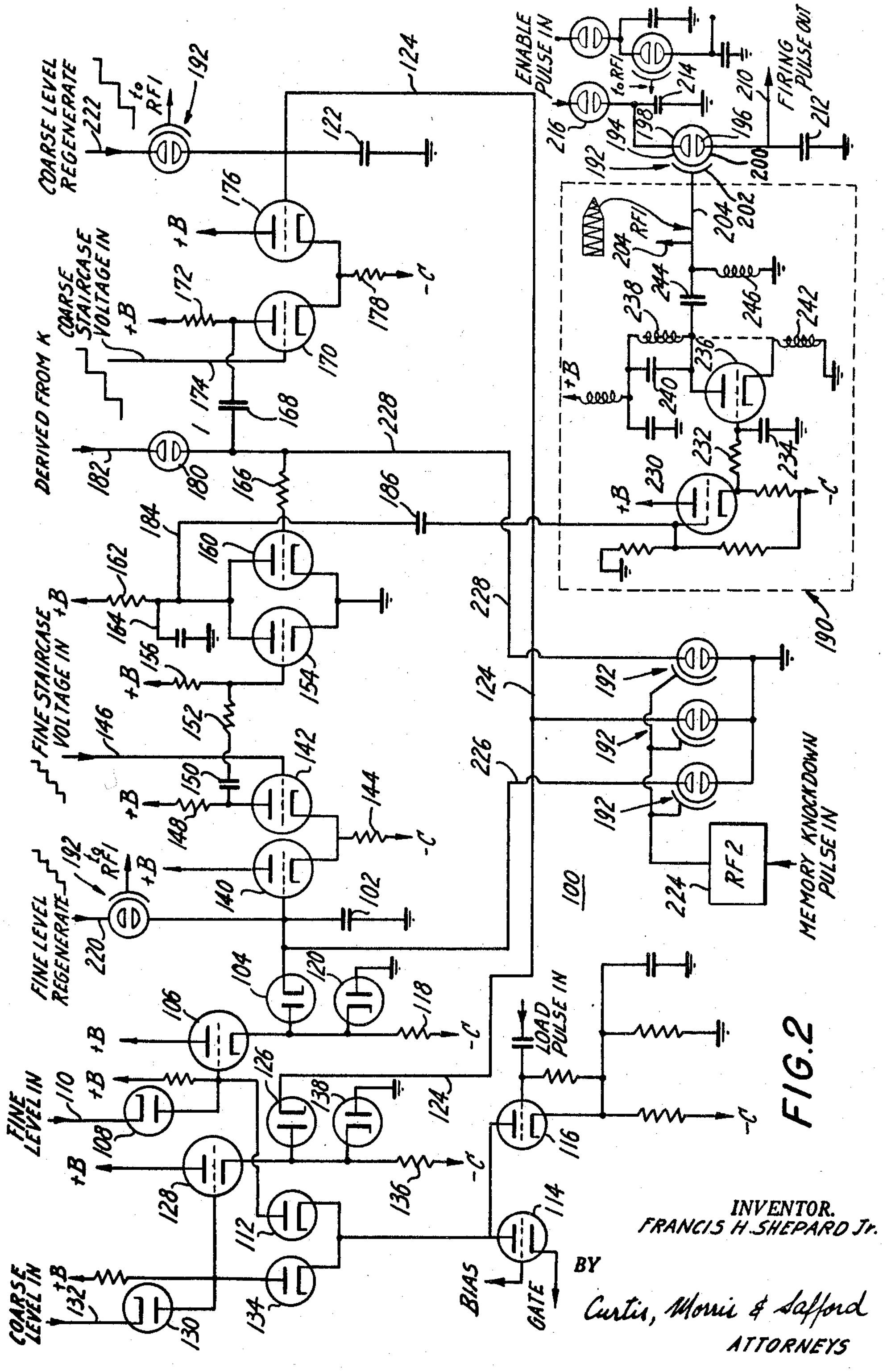
Figure 3:
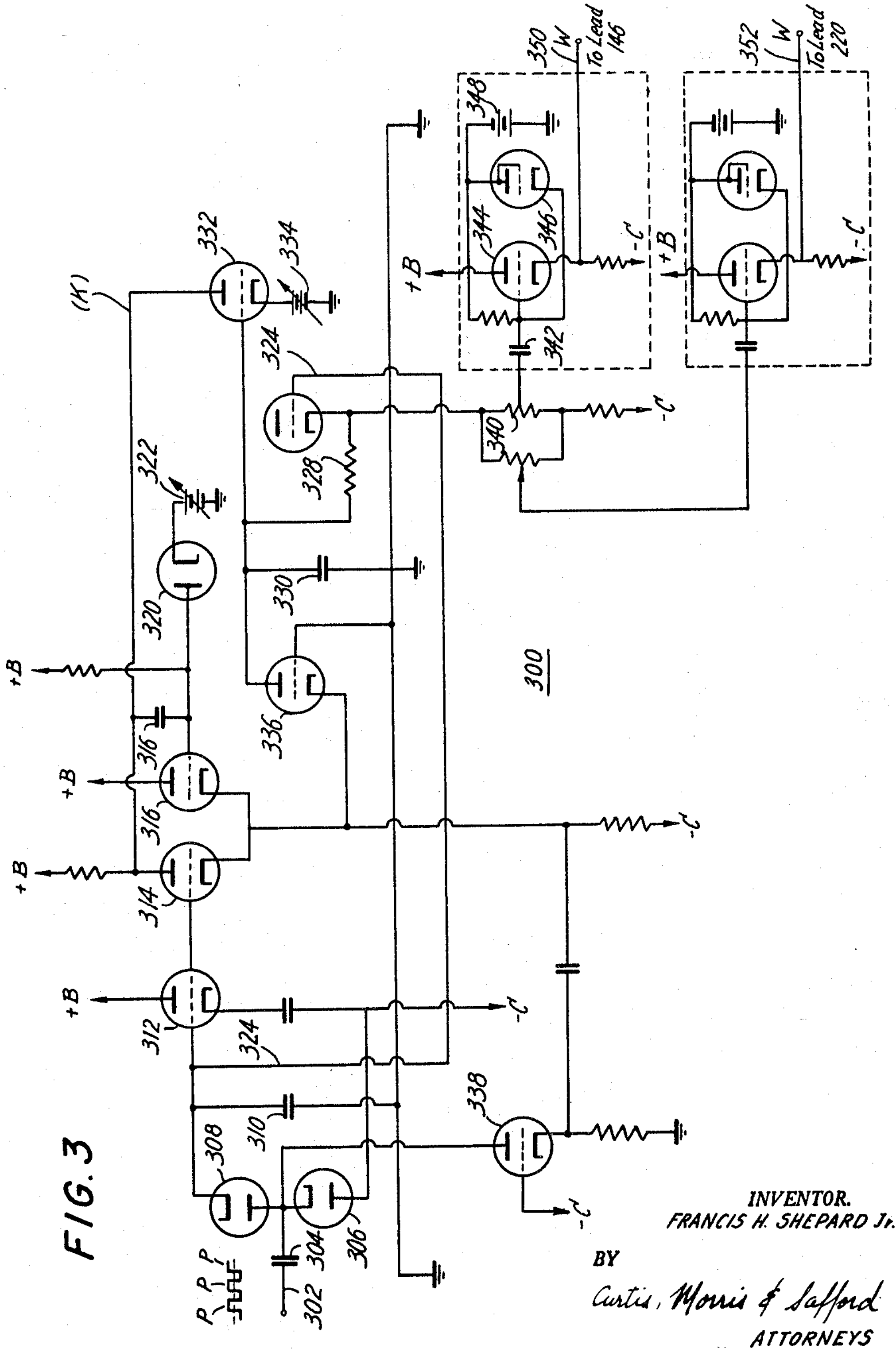

FIGURE 2 shows a capacitor memory system embodying features of the invention; and FIGURE 3 shows a fine staircase voltage generator used with the system shown in FIGURE 2.

Line *a* of FIGURE 1 represents by short vertical lines P, which in practice are narrow voltage pulses, a sequence of 64 numbers. Assuming that these correspond to the print characters in the above described high speed printer, the entire sequence will be repeated upon each revolution of the print wheels. Each pulse in the sequence of line *a* identifies in time a particular character on a print wheel, and the characters or numbers are evenly spaced in time. Knowing at what instant a particular number occurs (by counting and remembering as described below) it is then possible to actuate a type hammer and print the corresponding character.

Line *b* of FIGURE 1 shows a fine staircase voltage waveform having a vertical riser R at the instant of occurrence of each pulse P in line *a* and having a horizontal level L for the time between pulses. The first waveform W represents eight pulses, namely, 0 to 7. Approximately midway between numbers 7 and 8 the waveform returns or is knocked down as indicated at K to zero level and then at number 8 a second waveform W repeats, and so on.

Line *c* of FIGURE 1 shows a coarse staircase voltage waveform Y having a vertical riser Q occurring just before every eighth pulse P up to 64, and then repeating in a second waveform Y, etc. This coarse staircase Y is generated synchronously with the fine staircase W, each knockdown K serving as a timing pulse to initiate as a suitable delay each riser Q of the coarse staircase. The latter has a corresponding step or level S to identify each octal group in line *a*, fine staircase W serving to identify each pulse in each octal group. Thus, for example, pulse number 11 will occur during the second step of the coarse staircase and exactly at the fourth riser of the fine staircase. In this way, by "remembering" the particular levels of the coarse and fine staircases, any one of the 64 numbers is identified in time.

FIGURE 2 is a schematic diagram of an electronic memory circuit 100 provided according to the invention. Near the left center of the drawing is shown a fine memory capacitor 102 which is adapted to be charged to a level corresponding (but differing by a fixed amount) to a level L of a fine staircase W in line *b* in FIGURE 1. This capacitor need not be large or specially made, it should however be free of "hysteresis." A 1000 micromicro-farad (1000 mmf.) Mylar tubular capacitor has been found very satisfactory in this particular circuit.

Capacitor 102 is adapted to be charged to a desired level through a de-coupling diode 104 from the cathode of a buffer tube 106. The grid of this tube is connected through a de-coupling diode 108 to a fine level input lead 110 to which is applied the desired voltage level. This voltage is derived, for example, from binary digits recorded on a magnetic tape, these digits being read from the tape and then translated in a suitable decoder circuit (not shown, but known in the art) to a voltage of given level. However, as will be explained later, before this voltage can be applied to memory capacitor 102, tube 106 must be unblocked, this being accomplished by unclamping its grid. The grid of tube 106 is normally biased to cut off by means of a diode 112 whose cathode is connected to the plate of a gating tube 114 and a "load pulse" input tube 116. When either of the latter is conducting, the grid of tube 106 is held sufficiently negative so that it cannot conduct. When both are off, the D.C. level on lead 110 is applied through tube 106 and diode 104 to memory capacitor 102. To insure that the proper D.C. level is transmitted through tube 106, its cathode is biased to −C by a load resistor 118 and it is also clamped to −B by a diode 120. Tube 106 need only be energized briefly (tube 114 being gated open and tube 116 being momentarily pulsed off) to charge memory capacitor 102 to a desired level, thereafter the tube is turned off and the capacitor is held at this voltage (for as long as desired, as will be explained) until another voltage is fed in through tube 106.

On the right in FIGURE 2 is a coarse memory capacitor 122 which is adapted to remember a voltage corresponding (but differing by a fixed amount) to a level S of a coarse staircase Y in line *c* of FIGURE 2. This capacitor, which is identical to fine memory capacitor 102, is connected via a lead 124 through a de-coupling diode 126 to the cathode of a buffer tube 128. This tube is connected and operated the same way as buffer tube 106, the grid of tube 128 being connected through a diode 130 to a coarse level input lead 132. This grid of tube 128 is normally biased off by a diode 134 whose cathode is connected in common with the cathode of diode 112 to the plates of tubes 114 and 116. The cathode of buffer tube 128 is connected through a resistor 136 to −C and is clamped by a diode 138 connected to −B.

Assuming that the desired voltage levels to be applied to the memory capacitors 102 and 122 exist respectively on leads 110 and 132, and that tube 114 has previously been placed in open gate condition, then a momentary negative pulse applied to tube 116 will cause both memory capacitors to be loaded to the desired levels, respectively. As soon as the loading pulse applied to tube 116 disappears, the tube again conducts and blocks both buffer tubes 106 and 128 thereby disconnecting them, though the action of diodes 104 and 126, from their respective memory capacitors.

Fine memory capacitor is connected via the grid of a cathode follower tube 140 to the cathode of a "fine level coincidence" tube 142, the common cathodes of these tubes being connected to a load resistor 144 and −C. The grid of coincidence tube 142 is connected to a lead 146 to which is applied a fine staircase voltage W, cyclically repeated, as illustrated by line *b* of FIGURE 1. Whenever this voltage rises above the voltage level then at memory capacitor 102, a negative pulse appears at the plate of tube 142 across its load resistor 148. This negative pulse is coupled through a small capacitor 150 and a decoupling resistor 152 to the grid of a tube 154. This latter tube is normally biased on through a grid resistor 156 connected to +B. The tube is connected in parallel with a similar tube 160, also normally on and which, as will appear, is gated off by the coarse staircase waveform Y in conjunction with coarse memory capacitor 122.

To determine precisely the timing of the negative pulse appearing at the plate of tube 142, the voltage on fine memory capacitor 102 is set approximately midway between two successive voltage levels L of waveform W. Thus precisely at the riser R between these levels, the fine staircase voltage W will become greater than the voltage of fine memory capacitor 102, and thereupon, as explained above, a negative pulse will appear at the plate of tube 142 and momentarily turn tube 154 off. Now, when tube 160 is at the same time also off, a positive voltage pulse will appear at the plates of these tubes across their load resistor 162. A small RF (radio frequency) capacitor 164 bypasses this resistor to ground. Unless tube 160 is off, there effectively cannot be a positive voltage pulse at the plate of the tube and tube 154.

The grid of tube 160 is normally positive and is coupled through a resistor 166 and a capacitor 168 to the plate of a tube 170, a load resistor 172 connecting this plate to +B. The grid of the latter tube receives via a lead 174 the coarse staircase voltage waveform Y. Tube 170 operates in conjunction with a tube 176, these tubes having a common cathode resistor 178 connected to −C. When the coarse staircase Y exceeds the voltage set on coarse memory capacitor 122, a negative voltage appears at the plate of tube 170. This voltage has a duration approximately equal to the duration of the remaining coarse staircase (i e. until the resetting of the coarse staircase level K on the coarse staircase in FIGURE 1) and is applied to the grid of tube 160 to turn it off during one coarse level during this interval. At the knockdown K of the fine staircase W corresponding to the particular coarse staircase level S in question, a positive voltage pulse is applied to the grid of tube 160 through a cold gas diode 180 via a lead 182. This puts a voltage charge on capacitor 168 and holds tube 160 on through the end of the present coarse staircase waveform Y and until the interval in the next waveform Y when the coarse staircase voltage again rises above the level set on coarse memory capacitor 122. Because the risers Q of voarse staircase waveform Y occur just slightly before the corresponding risers R of fine staircase waveforms W, tube 160 will, at the selected eight pulse interval, be turned off for a time long enough to encompass all eight risers R of the thus selected waveform W. As with the voltage set on the fine memory capacitor, the voltage set on coarse memory capacitor 122 is set at a value between two successive steps S of waveform Y. Thus the point at which a coarse staircase Y exceeds the voltage set on coarse memory capacitor 122 is marked by a riser Q of the coarse staircase.

The positive voltage pulse appearing at the plates of tubes 154 and 160 when there is a dual coincidence between the fine and coarse staircase voltages respectively, and the corresponding voltages set on the fine and coarse memory capacitors, is applied via a lead 184 and a coupling capacitor 186 to an RF generator indicated at 190. The momentary voltage applied to the input of the generator produces a momentary but somewhat longer burst of RF voltage, as indicated by the waveform at the right of the generator, which dies exponentially, rather than suddenly, to zero.

This burst of RF voltage is used to control a unique switch, now to be described. One such switch is indicated, to the right of generator 190, at 192. This comprises a gas diode 194, such as a neon NE–2, having two electrodes 196 and 198 in a gas filled envelope 200. Surrounding this envelope is a conductive tubular sleeve 202. The latter is connected to the output lead 204 (RF1) of generator 190.

When the RF voltage burst described above appears on shield 202, the gas inside tube 194 is ionized and the tube becomes a good conductor, hence a closed switch. When the RF voltage dies out the gas de-ionizes (assuming the potential across electrodes 196 and 198 is less than the glow voltage) and the tube ceases altogether to conduct. It then becomes an open switch. Because the RF voltage is controlled to die out gradually, the tendency of self-rectification of the gas diode is eliminated. This is most important. If the RF voltage were turned off suddenly, there would on the average be a volt or so drop across electrodes 196 and 198 at the instant of cutoff. Now, where a switch 192 is being used to charge a capacitor (such as fine memory capacitor 102) to exactly a given voltage, there cannot be tolerated any voltage drop across the switch at the instant of turnoff. Accordingly, the use of a gradually dying-out RF voltage pulse to actuate such a switch is essential.

The output signal from circuit 100 is obtained at its lower right from a lead 210 which is bypassed to ground by a small capacitor 212 and is connected to one side of a switch 192. When this switch is turned on, there is established a conductive path to a storage capacitor 214. The latter is adapted to be charged to a suitable voltage through a gas diode 216 and thereafter left in charged condition until switch 192 is closed. An important advantage of this arrangement is that an output signal is obtained only if capacitor 214 has been charged, moreover, this output signal can have a sizeable magnitude at low impedance even though the signal actuating RF generator 190 is small. Further, as many separate output signal leads as desired can be provided simply by providing additional elements, as indicated.

The RF lead 204 is also connected to another switch 192 one side of which is connected to fine memory capacitor 102 and the other side of which is connected to a lead 220. The latter is energized with a voltage having a waveform identical to fine staircase W but suitably shifted down in D.C. level. Thus for a given level L of staircase W, the corresponding level of the voltage on lead 220 will be approximately midway between this level L and the one below or preceding it. The voltage on lead 220 is in fact derived from the fine staircase voltage by taking the latter and shifting its absolute or D.C. level down by an appropriate fixed amount.

Now when RF lead 204 is energized, the switch 192 in series with fine memory capacitor 102 and lead 220 will be closed for a short instant. But the voltage at this instant on lead 220 will be precisely equal to the voltage which is being remembered by capacitor 102. Accordingly, even though some of the voltage previously set on capacitor 102 (through tube 106 or from lead 220) has since leaked off, the voltage will now be re-set from lead 220 to the exact value it should have. Once set to a given voltage, fine memory capacitor will continue to be re-set in this manner until intentionally set to a different voltage (through tube 106).

Simutaneously with the continual regeneration of the voltage on fine memory capacitor 102, coarse memory capacitor 122 is re-set to the desired voltage through a switch 192 and a lead 222. The latter has applied to it a voltage derived from the coarse staircase Y but shifted down in D.C. level an appropriate fixed amount.

Near the lower center of FIGURE 2 is a cluster of three switches 192, one side of each being grounded. They are controlled in unison by an RF generator 224 similar to generator 190 but independently actuated. When turned on, the first of these switches through a lead 226 discharges fine memory capacitor 102. The second switch grounds lead 124 and discharges coarse memory capacitor 122.

The third switch through a lead 228 grounds one side of capacitor 168 and insures that tube 160 is turned on. Thereafter, when these three switches are opened, the fine and coarse memory capacitor can be set to whatever new levels are desired. The setting of new voltages to be remembered can be accomplished very quickly.

RF generator 190 includes an input buffer tube 230 which is connected via a pulse stretching network consisting of a resistor 232 and a capacitor 234 to an oscillator tube 236. Network 232, 234 keeps the oscillator turned on for longer than the duration of the pulse applied to buffer tube 230 and this network also gradually turns the oscillator off so that the burst of RF voltage on lead 204 does not die out suddenly. Tube 236 in conjunction with a high-Q coil 238, a resonant capacitor 240 and a feedback coil 242 functions as a Hartley type oscillator. Its output is applied through a coupling capacitor 244 to lead 204. A choke coil 246 grounds lead 204 to D.C. In an actual unit the RF pulse applied to lead 204 had an amplitude of about 100 to 200 volts, a frequency of about 2 megacycles, a duration of 30 to 40 microseconds, and a die-out of 10 to 15 microseconds. The interval between pulses P was about 800 microseconds and the peak-to-peak amplitude of a waveform W or Y, about 70 volts.

FIGURE 3 shows a fine staircase generator 300 which is adapted to supply the requisite voltages to leads 146 and 220 in FIGURE 2. Also, a pulse K is derived from generator 300 which after suitable amplification and shaping is applied to lead 182 in FIGURE 2. The operation of circuit 300 is for the most part conventional and will be understood by those skilled in the art. Accordingly, only a brief description of the circuit will be given. It is to be understood that a closely similar circuit can be used to generate the coarse staircase voltages needed in FIGURE 2 (leads 174, 222).

Circuit 300 at the left has an input terminal 302 adapted to be energized by a symmetrical square wave, derived from pulses P in FIGURE 1 and having the same repetition rate or frequency. This square wave is applied through a capacitor 304 to a pair of clamping diodes 306 and 308 to charge a capacitor 310 step-by-step. To the right of the latter is connected a tube 312 which serves as a cathode follower to keep the charging of the capacitor linear. The ratio of capacitor 310 to capacitor 304 determines the amount of each step of waveform W.

To the right of tube 312 is connected a tube 314, which in conjunction with a tube 316, a capacitor 318, a clamping diode 320 and an adjustable battery 322 determine the number of steps in a waveform W.

Also connected to the same potential as the grid of tube 312 through a lead 324 is a cathode follower tube 326. This through a resistor 328 is adapted to charge a capacitor 330. The latter when sufficiently charged raises the potential on the grid of a tube 332 adjustably biased through a battery 334 to cause the knockdown of waveform W as indicated at K in FIGURE 1. Battery 334 can be adjusted to locate knockdown K where desired. A tube 336 discharges capacitor 330. To insure that capacitor 310 returns to its consistent zero position the cathode of tube 336 is used as a negative clamp or excursion limit for the cathode of 316 and 314 which discharges capacitor 310 through the grid-cathode current of tube 312. To insure that capacitor 304 returns to its zero condition upon knockdown a tube 338 is provided.

One output of circuit 300 is obtained through a gain adjusting resistor 340 in the cathode of tube 326. This is coupled via a capacitor 342 to a cathode follower tube 344 and a D.C. level adjusting diode 346 and battery 348. Waveform W is obtained at terminal 350. A similar waveform but shifted in level (for lead 220 in FIGURE 1) is obtained at terminal 352 from an identical arrangement.

It is to be understood that a single generator 300 can supply a number of memory circuits 100. Also, where a smaller capacity memory is desired, the coarse staircase portion, for example, of circuit 100 can be dispensed with. The above description of the invention is intended in illustration and not in limitation. Various changes or modifications in the embodiment set forth may occur to those skilled in the art and can be made without departing from the spirit or scope of the invention as set forth.

I claim:

1. A memory system comprising a capacitor adapted to be charged to a voltage to be remembered, coincidence means to compare said voltage with a changing voltage, and reset means responsive to said coincidence means to periodically recharge said capacitor to said voltage to be remembered, and in further combination with means for generating a staircase voltage from a train of pulses, said capacitor holding a particular voltage corresponding to a point on said staircase, said coincidence means determining when said staircase voltage crosses said capacitor voltage, and signal output means responsive to said coincidence means to give an output pulse.

2. The system as in claim 1 wherein said re-set means includes switch means actuated by said output pulse for applying to said capacitor a re-set voltage effectively equal to said particular voltage, whereby said particular voltage will be held indefinitely until intentionally changed to different value.

3. A capacitor memory system comprising a capacitor, means to charge said capacitor to a first voltage, coincidence means connected to said capacitor, means to apply a staircase voltage to said coincidence means, output signal means responsive to said coincidence means upon the equaling of said staircase voltage and said first voltage, and switch means controlled by said output means to recharge said capacitor effectively to said first voltage.

4. The system as in claim 3 wherein said means to charge said capacitor includes means to first return said capacitor to zero condition.

5. The system as in claim 3 in further combination with a second capacitor adapted to remember a second voltage, said second capacitor also being connected to said coincidence means, and second means to apply a staircase voltage to said coincidence means whereby only upon the dual coincidence of said staircase voltages and said first and second voltages respectively is an output signal obtained.

6. A system of remembering a voltage comprising, a capacitor, means for charging said capacitor to a given voltage to be remembered, means for generating a voltage changing with time, means for periodically comparing said capacitor voltage to said voltage changing with time and upon coincidence of said changing voltage and said capacitor voltage for recharging said capacitor effectively to the voltage to be remembered.

7. The system in claim 6 wherein said means to generate produces a voltage periodically repeating step-by-step or a first staircase voltage, and produces a second staircase voltage derived from the first staircase voltage but shifted in D.C. level so that its steps lie between the steps of said first staircase voltage, and said means for comparing immediately after said first staircase voltage crosses said capacitor voltage connects said capacitor to a level of said second staircase voltage whereby said capacitor is continually reset to effectively said given voltage.

References Cited

UNITED STATES PATENTS

| | | | |
|---|---|---|---|
| 2,840,707 | 6/1958 | Johnson | 328—151 |
| 2,946,013 | 7/1960 | Deighton | 328—151 |

BERNARD KONICK, *Primary Examiner.*

J. F. BREIMAYER, *Assistant Examiner.*